United States Patent
Brugler et al.

(10) Patent No.: US 8,743,134 B2
(45) Date of Patent: Jun. 3, 2014

(54) INTERACTIVE COMPARATIVE ANALYSIS OF MULTIPLE OBJECT DATA VISUALIZATIONS

(75) Inventors: Thomas S. Brugler, Fuquay-Varina, NC (US); Vincent C. Conzola, Raleigh, NC (US); Randall A. Craig, Raleigh, NC (US); Todd M. Eischeid, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/292,334

(22) Filed: Nov. 9, 2011

(65) Prior Publication Data

US 2013/0113815 A1    May 9, 2013

(51) Int. Cl.
| | |
|---|---|
| G09G 5/00 | (2006.01) |
| G06F 17/00 | (2006.01) |
| G06F 3/00 | (2006.01) |
| G06F 3/048 | (2013.01) |
| G09G 5/02 | (2006.01) |
| G06T 11/60 | (2006.01) |
| G06F 3/0481 | (2013.01) |

(52) U.S. Cl.
CPC *G09G 5/02* (2013.01); *G06T 11/60* (2013.01); *G06F 3/04817* (2013.01); *G06F 3/0481* (2013.01)
USPC ........... 345/581; 345/589; 345/619; 345/156; 715/275; 715/700; 715/764; 715/835; 715/846

(58) Field of Classification Search
USPC ......... 345/418, 581, 589–590, 593–594, 619, 345/661, 665, 156; 715/200, 273, 275, 700, 715/702, 764–765, 769, 808–810, 835–836, 715/840, 846, 856; 358/537–540, 448, 461, 358/450, 452
See application file for complete search history.

(56) References Cited

U.S. PATENT DOCUMENTS

| | | | | |
|---|---|---|---|---|
| 5,586,237 | A * | 12/1996 | Baecker et al. | 345/670 |
| 6,636,243 | B1 * | 10/2003 | MacPhail | 715/772 |
| 6,661,434 | B1 * | 12/2003 | MacPhail | 715/772 |
| 7,107,238 | B2 | 9/2006 | Hatakama et al. | |
| 7,966,363 | B2 | 6/2011 | Boehm et al. | |
| 2002/0054101 | A1 * | 5/2002 | Beatty | 345/764 |
| 2008/0216022 | A1 * | 9/2008 | Lorch et al. | 715/847 |
| 2010/0179991 | A1 * | 7/2010 | Lorch et al. | 709/206 |
| 2011/0167016 | A1 | 7/2011 | Shaban et al. | |

* cited by examiner

*Primary Examiner* — Wesner Sajous
(74) *Attorney, Agent, or Firm* — Patrick J. Daugherty; Driggs, Hogg, Daugherty & Del Zoppo Co., LPA (57) ABSTRACT

Interactive analysis of data objects within a display includes displaying icons representing different data objects on a graphic display device at each of a plurality of unique locations within a multi-dimensional relational structure as a function of unique respective values of dimensions of a display data variable that is relevant to the display structure and common to each of the data objects represented by the icons, and wherein the icons each have initial respective graphic display appearances. Selecting an icon specifies a comparison data variable common to the data objects, wherein graphic display appearances of each of the icons are updated at their same, unique locations to revised dimensional graphic display appearances that visually indicate relationships of respective values of the selected common comparison data variable of their represented data objects to a value of the selected common comparison data variable of the data object represented by the selected icon.

16 Claims, 5 Drawing Sheets

INTERACTIVE COMPARATIVE ANALYSIS OF MULTIPLE OBJECT DATA VISUALIZATIONS

BACKGROUND

Embodiments of the present invention relate to conveying relationship information among multiple objects through display structures and formatting.

Data visualization applications comprehend displaying multiple objects in meaningful formats in a multi-dimensional display, wherein the display structure itself may overtly or inherently convey information about data associated with the objects. For example, two-dimensional displays may take advantage of values of the two dimensions of the display to convey information through relation of objects displayed thereon to the two dimension values. For example, icons representing each of a plurality of businesses may be plotted on a two-dimensional scaled map display as a function of their addresses, current Global Positioning Satellite (GPS) or latitude and longitude coordinates, etc.

Programmable devices commonly generate and provide such displays to users through display screens, often in real-time or otherwise promptly in response to user query inputs. Such multi-dimensional display information may be useful in orienting a user to background information about the objects being displayed, for example enabling a user to interact with a programmable device displaying the information to refine the information conveyed and query for additional detail. For example, a map scale displayed on a portable device may overtly convey relative distances between each business or from a reference point such as a user's plotted location on the map (home address, current GPS coordinate, etc.). The displayed spacing may also inherently convey general proximity information uniquely to a user; for example, with respect to the same display a first user in an automobile may perceive a business relatively close due to a short drive time, while another pedestrian user may consider it inconveniently too far.

A wide variety of information may be conveyed with regard to such entity representations. In other examples network objects may be displayed on a network topology diagram which provides location and/or connectivity information visually to a user. Governmental entities displayed on a political map may provide a familiar backdrop that lets users instantly locate states or other entities of interest, and which may provide a useful context other general information conveyed as a function of the entity structure, for example using different color or shading keys for dynamically indicating majority choices for a party or candidate during tabulation of election results.

BRIEF SUMMARY

In one embodiment of the present invention, a method for interactive analysis of data objects within a display includes displaying a plurality of icons representing different data objects on a graphic display device at each of a plurality of unique locations within a multi-dimensional relational structure as a function of unique respective values of dimensions of a display data variable that is relevant to the display structure and common to each of the data objects represented by the icons, and wherein the icons each have initial respective graphic display appearances. In response to a user selecting one of the icons and thereby specifying a comparison data variable that is common to each of the data objects represented by the icons, a processing unit generates an updated display of all of the icons at their unique locations within the multi-dimensional relational structure on the graphical display device, wherein the unique locations of the icons relative to the displayed multi-dimensional relational structure are unchanged but the graphic display appearances of each of the icons are updated to revised dimensional graphic display appearances. The revised appearances each visually indicate relationships of respective values of the selected common comparison data variable of their represented data objects to a value of the selected common comparison data variable of the data object represented by the selected icon.

In another embodiment, a method for providing a service for interactive analysis of data objects within a display includes providing one or more articles, including a computer infrastructure that causes a graphical display device to display a plurality of icons representing different data objects on a graphic display device at each of a plurality of unique locations within a multi-dimensional relational structure as a function of unique respective values of dimensions of a display data variable that is relevant to the display structure and common to each of the data objects represented by the icons, and wherein the icons each have initial respective graphic display appearances. In response to a user selecting one of the icons, wherein the selecting specifies a comparison data variable common to each of the data objects represented by the icons, the computer infrastructure causes the display to generate an updated display of all of the icons at their unique locations within the multi-dimensional relational structure on the graphical display device, wherein the unique locations of the icons relative to the displayed multi-dimensional relational structure are unchanged but the graphic display appearances of each of the icons are updated to revised dimensional graphic display appearances. The revised appearances each visually indicate relationships of respective values of the selected common comparison data variable of their represented data objects to a value of the selected common comparison data variable of the data object represented by the selected icon.

In another embodiment, a system has a processing unit, computer readable memory and a computer readable storage medium device with program instructions, wherein the processing unit, when executing the stored program instructions, causes a graphical display device to display a plurality of icons representing different data objects on a graphic display device at each of a plurality of unique locations within a multi-dimensional relational structure as a function of unique respective values of dimensions of a display data variable that is relevant to the display structure and common to each of the data objects represented by the icons, and wherein the icons each have initial respective graphic display appearances. In response to a user selecting one of the icons, wherein the selecting specifies a comparison data variable common to each of the data objects represented by the icons, the processing unit causes the display to generate an updated display of all of the icons at their unique locations within the multi-dimensional relational structure on the graphical display device, wherein the unique locations of the icons relative to the displayed multi-dimensional relational structure are unchanged but the graphic display appearances of each of the icons are updated to revised dimensional graphic display appearances. The revised appearances each visually indicate relationships of respective values of the selected common comparison data variable of their represented data objects to a value of the selected common comparison data variable of the data object represented by the selected icon.

In another embodiment, an article of manufacture has a computer readable storage medium device with computer readable program code embodied therewith, the computer readable program code comprising instructions that, when executed by a computer processor, cause the computer processor to cause a graphical display device to display a plurality of icons representing different data objects on a graphic display device at each of a plurality of unique locations within a multi-dimensional relational structure as a function of unique respective values of dimensions of a display data variable that is relevant to the display structure and common to each of the data objects represented by the icons, and wherein the icons each have initial respective graphic display appearances. In response to a user selecting one of the icons, wherein the selecting specifies a comparison data variable common to each of the data objects represented by the icons, the computer processor causes the display to generate an updated display of all of the icons at their unique locations within the multi-dimensional relational structure on the graphical display device, wherein the unique locations of the icons relative to the displayed multi-dimensional relational structure are unchanged but the graphic display appearances of each of the icons are updated to revised dimensional graphic display appearances. The revised appearances each visually indicate relationships of respective values of the selected common comparison data variable of their represented data objects to a value of the selected common comparison data variable of the data object represented by the selected icon.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Complexities arise when a user queries for further different or additional relational data information with regard to the data objects beyond information conveyed by a multi-dimensional display. For example, a two-dimensional display may convey identification regarding plotted data objects through their positioning relative to each of the dimensions, thus taking advantage of the two-dimensions of the display to convey information through relation of objects displayed thereon to the two dimensions. However, such displays are often not presented in a manner that gives the user much control over what is presented. This is true particularly when users may be interested in making comparisons among objects. If a user, for example, is interested in comparing a particular object with other objects in the display, the means by which a user can accomplish this task in the prior art are limited. A user interested in making specialized comparisons must generally be relegated to some type of separate, often tabular report. While such reports may be valuable, introduction of the report may diminish the efficacy of the original two-dimensional display. In one aspect the rote listing of data in a report does not provide the richness of the background information that is available in the original two-dimensional display.

Figure 1:
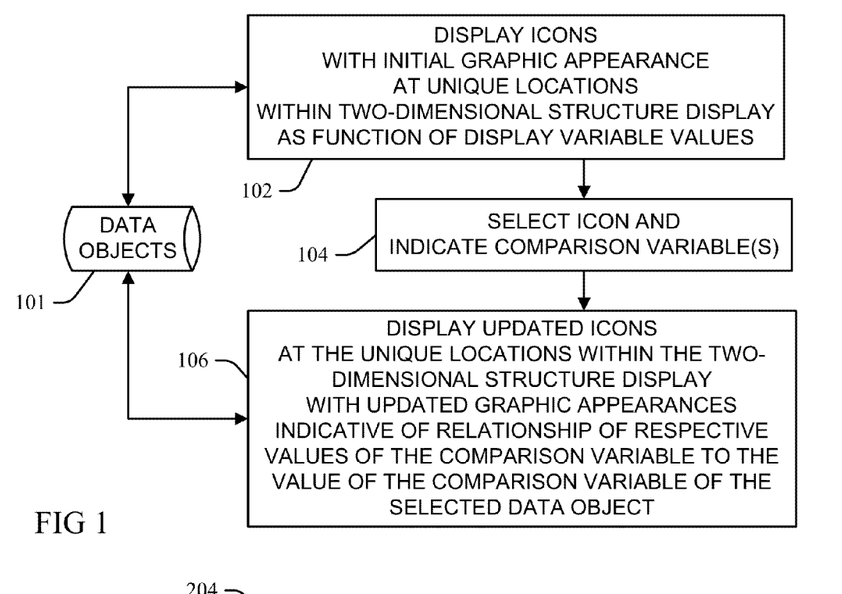
FIG. 1 is a block diagram illustration of an embodiment of a method, process or system for interactive analysis of data objects within a display according to the present invention.

FIG. 1 illustrates an embodiment of a method, process or system for interactive analysis of data objects within a display according to the present invention. At 102 a plurality of icons each representing different data objects 101 are displayed in initial respective two-dimensional graphic display appearances at unique locations within a two-dimensional relational structure. More particularly, the unique icon locations are chosen and arranged within the two-dimensional relational structure to convey relational information of respective values of a display data variable that is relevant to the display structure and common to each of the data objects represented by the icons.

At 104 a user selects one of the icons, wherein the selection further specifies one or more comparison data variables that are common to the represented data objects. In response to the selection, an updated display of all of the icons within the two-dimensional relational structure is generated at 106 to convey information relative to comparing data from each of the other data objects to data within the data object represented by the selected icon. More particularly, at 106 the updated display locates the icons at the same (unchanged) unique locations within the two-dimensional relational structure relative to the other display elements as initially provided at 102 (thus maintaining the structure of the first display, and the information conveyed thereby), but wherein the two-dimensional graphic display appearances of each of the icons are revised as needed or otherwise updated so that each visually indicates the newly requested comparison information. The visual comparison information informs a viewer of the updated display of a relationship of values of the selected common comparison data variable or variables of the data objects associated with the each of the other respective icons to the same data variable(s) of the data object represented by the selected icon.

Figure 2:
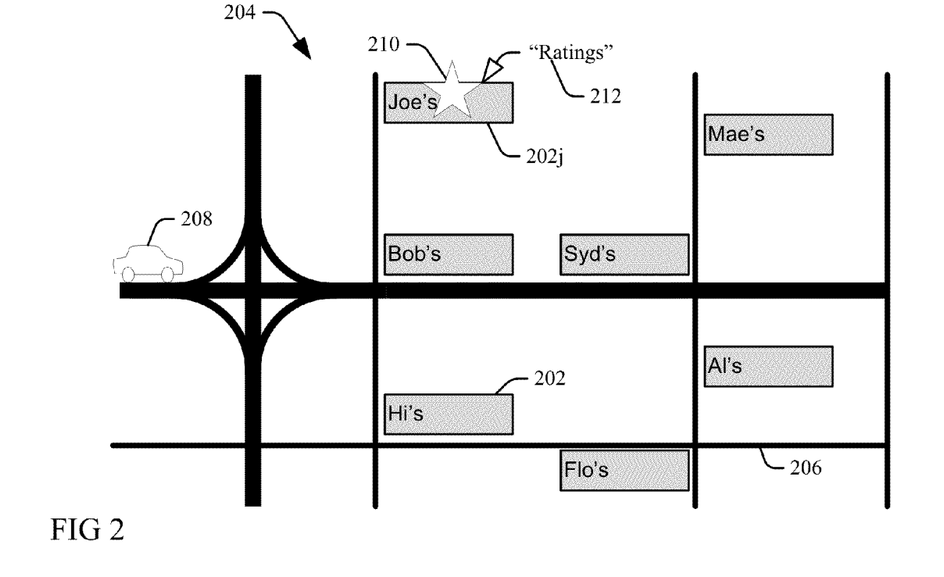
FIG. 2 is a diagrammatic illustration of a two-dimensional object display structure according to an embodiment of the present invention.

FIG. 2 illustrates one example of a first initial display generated at 102 of the embodiment illustrated in FIG. 1 and discussed above. A plurality of icons 202 each representing a different restaurant object are uniquely plotted on streets 206 of a scaled, two-dimensional map 204 of a specified geographic area, through using variable street address data of the underlying relational structures (i.e., they have different horizontal and vertical coordinates on the two-dimension display). The initial display conveys a first, general or universal level of relational information of the objects: the plotted physical locations of the icons 202 convey overall general physical location data as a function of their unique locations and the format of the displayed two-dimensional relational structure 204. Proximity information is thereby conveyed, of the objects relative to each other and to other display elements such as specific streets 206 or a current location of an automobile icon 208 representing a current location of a user receiving this display 204 (for example, on a display screen of a programmable cellular device). For example, the display structure 204 may convey a distance of the user position 208 in terms of distance and/or travel time to each of the restaurants 202, and also inherently these same values with respect to each other.

In the present example each of the icons 202 in the initial display at FIG. 2 have a similar initial respective two-dimensional graphic display appearance: common rectangular icons 202 are used having the same shape and level of color channel shading. The present example uses a single, greyscale color channel shading, though other embodiments of the present invention may use color shadings comprising more than one color channel. Each of the icons is distinguished through their different plotted locations, and also through unique text labels identifying the unique business names of their respective restaurant data objects. Thus, this initial display 204 of the icons 202 indicates a first level of relational data of the objects: the common icon shape/shading indicate that they are of a common object type (restaurants), but wherein each has a unique business name (as labeled) and geographic location (as conveyed by the different plotted geographic horizontal and vertical location coordinates).

FIG. 2 also illustrates a subsequent selection of one of the icons (at 104, FIG. 1) by the user through a graphical user interface cursor routine associated with a star-shaped cursor 210, the cursor selection further indicating or specifying a value of "ratings" data variable 212 common to each of the represented data objects. The selection and variable indication may be accomplished through a variety of techniques, including cursor and pop-up dialog window routines, wherein the pop-up window has radio button or text entry boxes, and still other techniques will be apparent to one skilled in the art. Thus, the selection enables use of the selected object (Joe's restaurant, represented by the "Joe's icon 202j) as a basis for comparison to each of the other restaurants in second level relational data comparison. In the present example the user may have prior knowledge of the quality of Joe's, or access to another independent rating, and thus Joe's may serve as a useful baseline for comparison to each of the other restaurants. Rather than being limited to a query for general individual ratings for each restaurant, as is typical in the prior art (which might add ratings to the icons from the universal rating data), the user is enabled through the present embodiment to select Joe's and use its rating as a comparison baseline for a second level of relational data, thereby comparing a restaurant that the user has knowledge of against others that she may not be familiar with.

Figure 3:
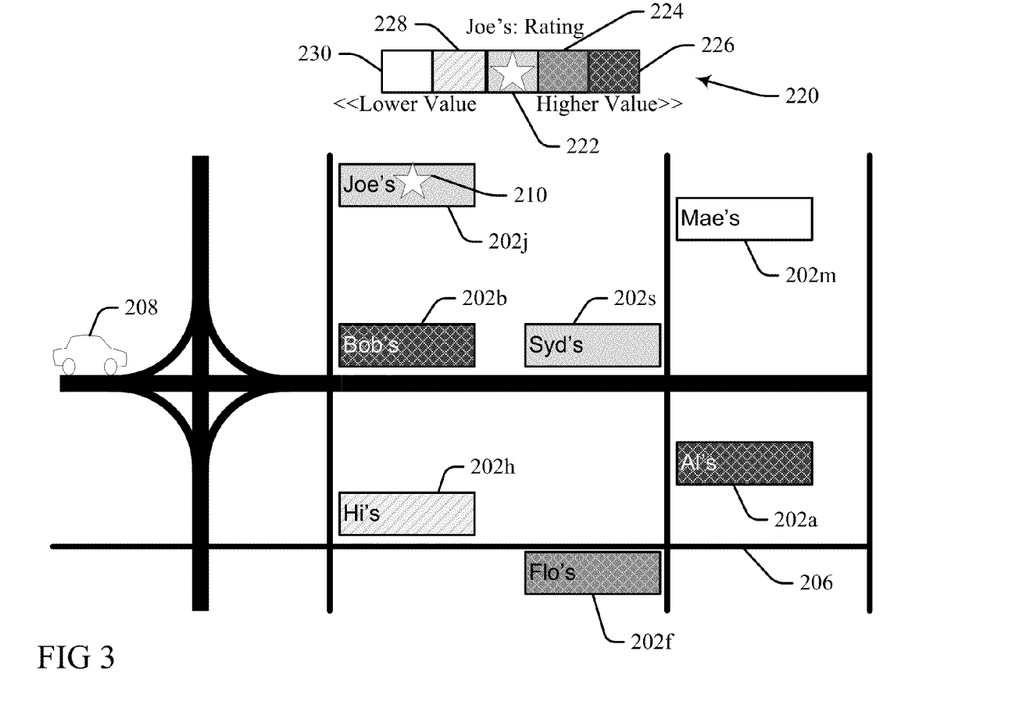
FIG. 3 is another diagrammatic illustration of a two-dimensional object display structure according to an embodiment of the present invention.

Thus, in response to the icon and variable selection, an updated display of all of the icons within the two-dimensional relational structure is generated (at 106, FIG. 1) and illustrated in FIG. 3. In the updated display the icons 202 are located at their same, unchanged unique locations within the two-dimensional relational structure represented by the map 204 relative to the locations of the other display elements 202, 206 and 208 as initially illustrated in FIG. 2 (at 102, FIG. 1). However, the shadings of each of the icons 202 are updated and redrawn as necessary to indicate their rating values relative to the rating value of Joe's restaurant, and thus convey the second level of relational data (all objects mapped to Joe's) within the same display structure to maintain the display of the first level of relational data (all objects mapped to a universal set of geographic coordinates).

Thus, Joe's icon 202j is marked with the selection icon 210, which identifies its associated data object as providing the baseline comparison value for the selected comparison variable. The shading of Joe's icon 202j is also revised if necessary or otherwise updated to a median shading level indicating the median baseline level rating of Joe's rating, which may also be optionally defined in a legend 220 that may be displayed in association with the map 204. The optional legend 220 provides a key to a plurality of shadings used to update the icons 202 to reflect their rating values relatives to Joe's. In the present example Joe's icon 202j is updated to a middle, median gray-scale shading 222 appearing as a middle shade in the legend 220 (and in the present example further identified through labeling with the selector symbol 210).

The other, remaining icons 202 are thus updated relative to Joe's rating value. The icons representative of restaurants with a next highest level of rating relative to Joe's, such as Flo's 202f, are updated to a next darker shading 224 indicating the next-higher level. The icons representative of restaurants with the highest level of rating relative to Joe's, such as A1's 202a and Bob's 202b, are updated to the darkest shading 226 indicating the highest possible rating relative to Joe's. Restaurants with a next lower level of rating relative to Joe's, such as Hi's 202h, are updated to a next lighter shading 228. Restaurants with a lowest level of rating relative to Joe's, such as Mae's 202m, are updated to the lightest shading 230. Restaurants having the same rating as Joe's, such as Syd's 202s, are updated to the same, median shading level 222.

In some examples, the basis for the second level of relational comparisons may be quickly and easily changed by dragging the selector icon 210 to a position upon another of the restaurant icons 202, for example moving it from Joe's 202j to Flo's 202f, wherein the shading and legend key are again updated by the new position to show comparisons to Flo's restaurant.

Figure 4:
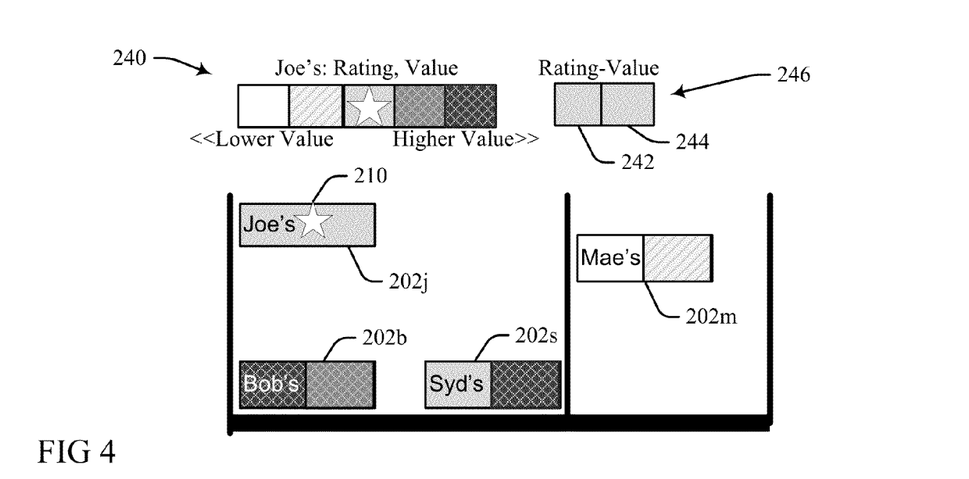
FIG. 4 is another diagrammatic illustration of a two-dimensional object display structure according to an embodiment of the present invention.

FIG. 4 illustrates another example wherein selection of an icon 202 indicates two variables for comparison to the selected underlying data object. More particularly, in this example selection of Joes' icon 202j (at 104, FIG. 1) indicates that both the first "rating" variable and a second "dining value" variable are to be used to display relative comparison information through icon shadings. Thus, as illustrated with respect to the portion of the map display 204 of FIGS. 2 and 3, a two-variable legend key 240 again indicates the lower-to-higher relative values signified by the shadings with respect to each of the two "rating" and "dining value" variables. The key 240 also includes a split shading key field 246 that informs the user that the left side shading 242 of each icon is indicative of the rating variable, while the right side shading 244 is indicative of the value variable. Accordingly, Syd's icon 202s informs the user that while Syd's and Joe's may be rated equally, Syd's also rated as a significantly better dining value, and thus should be generally selected over Joe's based on considering both variables. Mae's icon 202m informs the user that not only is Mae's dining quality rating much lower than Joe's (two-steps lower), it is also rated one step lower in dining value, which reinforces an indication not to select Mae's. Bob's icon 202b also reinforces the higher rated profile of Bob's over Joe's: not only is it rated much higher than Bob's but it is also indicated to have a great dining value.

Embodiments of the present invention thus introduce techniques that provide a user with control over what is being compared in a two-dimensional display. Users are able to select a particular object and make a variety of comparisons with other objects in the same display, wherein the user can instantaneously visualize comparisons among a large number of objects without losing the advantages afforded by the background information available in the base two-dimensional display.

Figure 5:
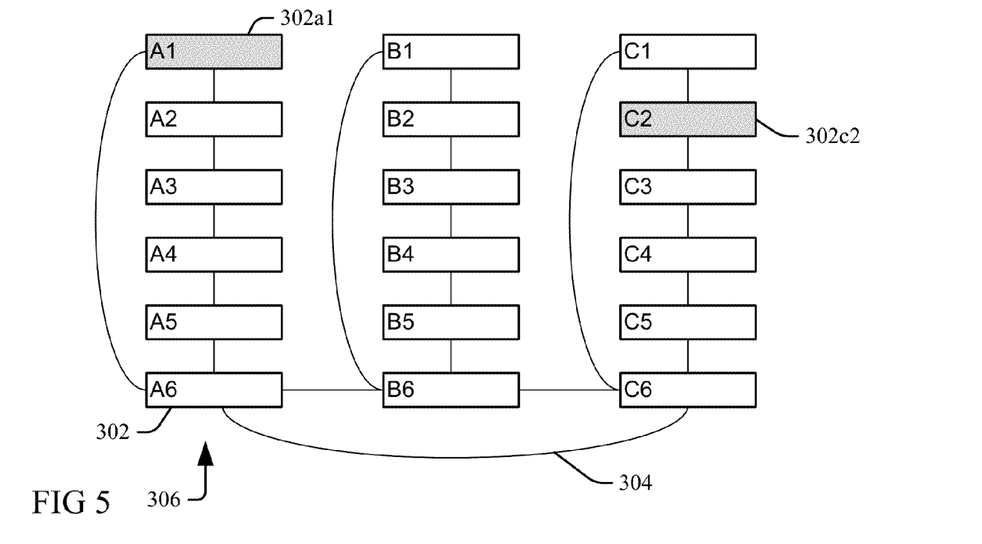
FIG. 5 is another diagrammatic illustration of a two-dimensional object display structure according to an embodiment of the present invention.

FIG. 5 illustrates a network topology diagram displaying the status of each of a plurality of network objects represented by the respective icons 302, wherein nodes A1 302a1 and C2 302c2 are displayed with shaded fill, indicating to a network operator (or systems manager, user, etc.) monitoring the network that they are in a problem state. The diagram also conveys first-level, global organization of the nodes 302. More particularly, each is in communication with other nodes through network connectors 304 within respective sub-set "A", "B" or "C" groupings denoted both by their display positioning within or without a respective vertical column 306 and by a first text label character within the icons 302, and wherein the columns are also linked by the connections 304. Each node 302 also has a unique identification in the structure, denoted both by unique horizontal/vertical display positioning and by a unique combinations defined by second text (number) characters with the first alpha label character within the icons.

In order to determine more information about the trouble nodes A1 302a1 and C2 302c2 (to help determine the root cause of the problems, generally troubleshoot, etc.), the network operator may use a comparison tool according to embodiments of the present invention to help shed some light on the problem by comparing either or both of these nodes with other nodes in the network. In one aspect comparing performance patterns of these nodes with other nodes in the network could provide clues as to what the problems are and could help determine ways to rectify the problems. In some embodiments a radio button may be used to toggle the display into a comparison view and provide a dialog box to choose comparison tools, though other routines may also be practiced. One option may be to "compare values" to compare the network objects on the most recent value of a selected variable, which may result in the graduated icon shadings distinguished by their distance to a median value of a key as will be understood through reference to the mapping example discussed above at FIGS. 2, 3 and 4.

Figure 6:
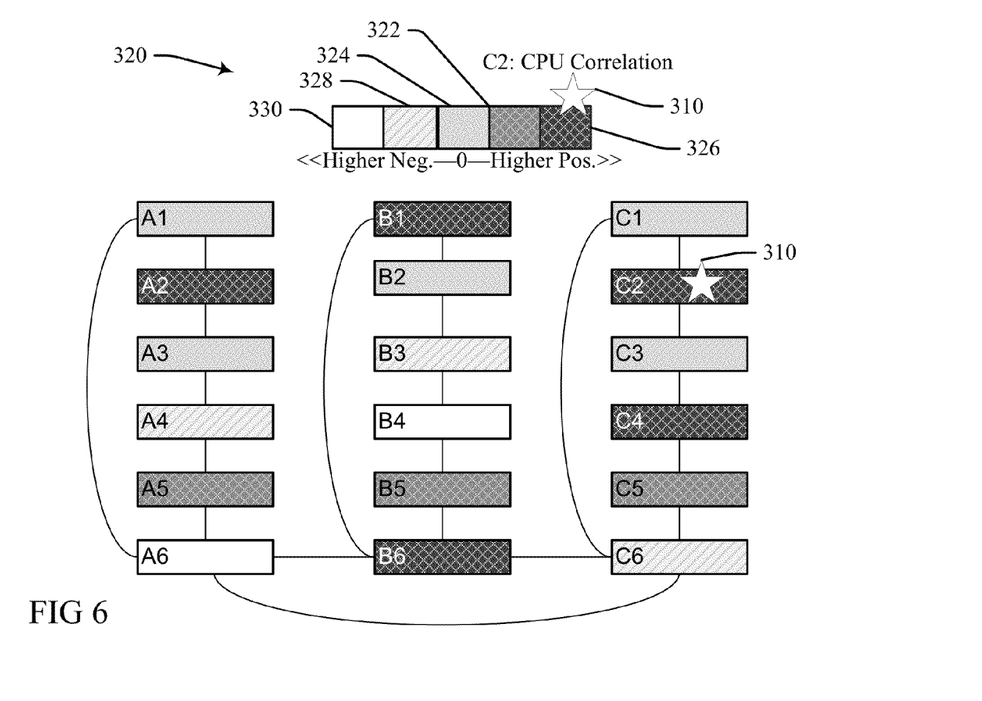
FIG. 6 is another diagrammatic illustration of a two-dimensional object display structure according to an embodiment of the present invention.

Another tool option is illustrated in FIG. 6, which provides an illustration of a correlation result comparison that gives the network operator preliminary information instantaneously about each other node in relation to a selected node of interest. A correlation basis may be more useful in comparing network objects than the value comparisons of FIGS. 3 and 4, in one aspect by allowing the network operator to get a preliminary comparison of performance patterns. More particularly, in the present example the network operator uses a selection star cursor 310 to generate "Central Processing Unit (CPU) Utilization" correlation comparison displays with respect to the trouble node C2 302c2. Other tool implementations include correlations to network response time, input errors, output errors, etc. The correlation formulas or statistics used in the correlation comparison (for example, Pearson coefficient) may also be specified or chosen, or accepted in default, as desired or needed by the network operator. The network operator may also be given a choice of ranges of time periods, in order to choose a most appropriate period depending upon what is of interest in any particular comparison.

Note that shadings have different meanings in this context compared to the comparison shadings displayed in FIGS. 3 and 4. More particularly, as indicated by the legend key 320, the CPU utilization pattern correlations to the pattern of the trouble node C2 302c2 get stronger as one travels to the right on the key 320, with the darkest/right-most shading 326 indicating the strongest, most positive correlation between the patterns. The next, less dark/less right-most shading 322 indicates a weaker positive correlation, and the middle shading 324 indicates a zero correlation between the patterns. The next patterns indicate negatively correlations between the patterns (for example, the extend to which they are inverse to each other), with the lightest/left-most shading 330 the strongest negative correlation, and the adjacent darker/more right-most shading 328 indicating a weaker negative correlation. In general the results displayed in FIG. 6 are used by an operator as a preliminary step to provide an overview summary of correlation results, which is useful in drilling down for more detailed information regarding the network performance.

Figure 9:
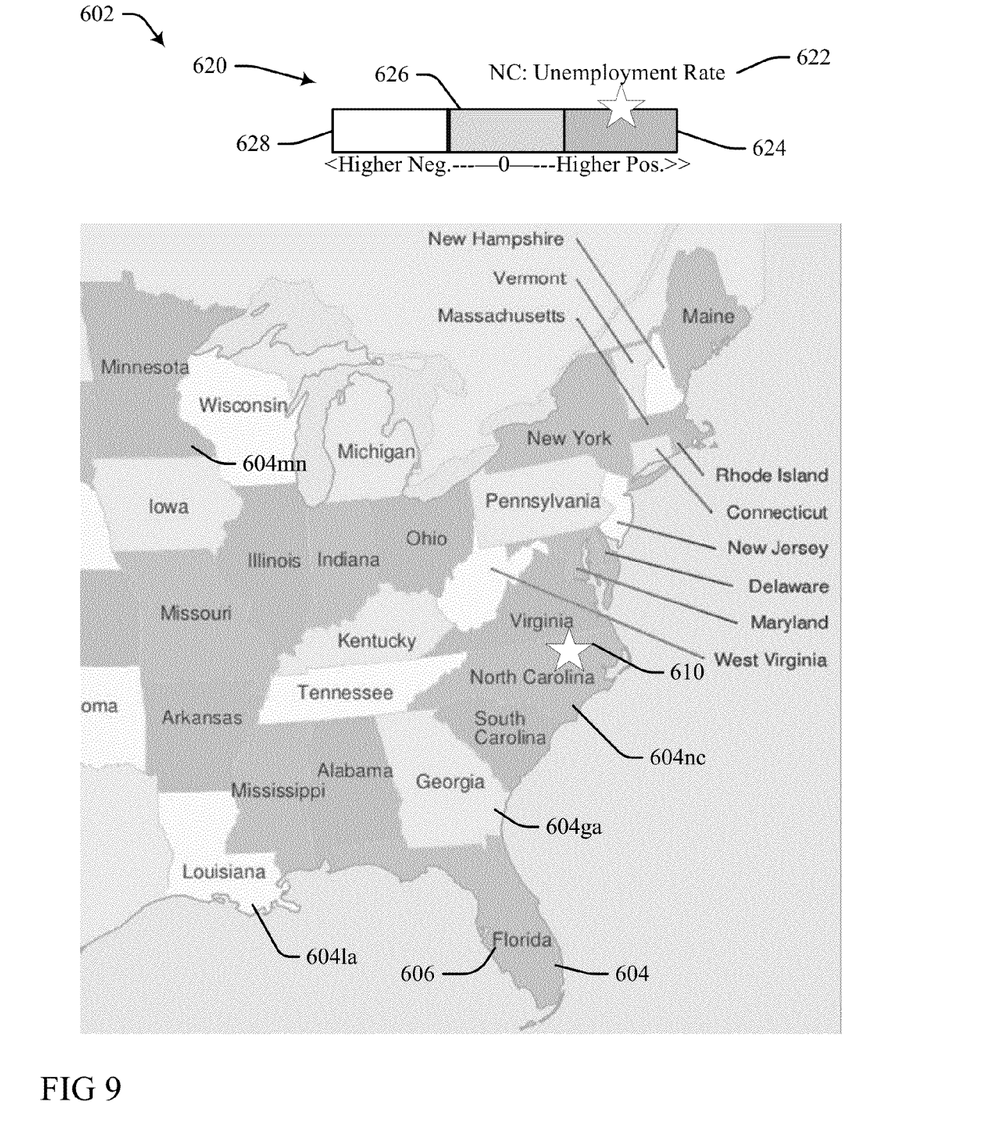
FIG. 9 is another diagrammatic illustration of a two-dimensional object display structure according to an embodiment of the present invention.

In another embodiment of the present invention FIG. 9 illustrates a map display 602 conveying a display of an eastern seaboard portion of the United States of America (USA). Individual states are illustrated with scaled shape icons 604 which convey their identities, geographic boundaries, positioning and sizing relative to each other in their readily identifiable icon shapes 604 and through text labels 606 in a first-level, global organization of the icons 604. Each is seen in their unique, appropriate positions relative to each other in the map 602, which is organized with respect to horizontal and vertical dimensions. Thus, one familiar with the USA may quickly recognize and find a desired state through use of the first-level organization of the icons 604 within the map 602, in one aspect independent of shadings or colorings of the icons 604 whether alike or similar.

FIG. 9 illustrates the icons 604 with a plurality of different, distinctive second-level shadings in response to use of a correlation tool according to embodiments of the present invention. More particularly, in the present example a user has selected the icon 604nc for the state of North Carolina through use of a star-shaped selection cursor 610, and entered a request to redraw the icon shadings of each of the icons 604 to illustrate the correlations of their respective unemployment rate trends (or patterns) to that of North Carolina. In some embodiments the user also selects or specifies the time periods and/or correlation formulas or statistics used in the correlation comparison (for example, Pearson coefficient), or accepts default values, for example through use of a dialog box or input field associated with the selection cursor 610.

As reflected by the title and cursor indicator heading 622 on the legend key 620, the shading darkness levels inform a user of the correlations of the respective unemployment rate trends for each of the other states to the unemployment rate trend of North Carolina, as function of the common specified (or default) time periods, correlation formulas or statistics. Positive correlations are indicated by the darkest/right-most shading 624, used to shade the Minnesota icon 604mn. The middle shading 626 indicates zero correlation between unemployment rate trends, for example as indicated by the shading of the Georgia icon 604ga. The lightest/left-most shading 628 indicates a negative correlation to the North Carolina unemployment pattern, as indicated by the shading of the Louisiana icon 604la. Thus, the user is informed at a glance by the redrawn map of the correlations to each of the other states to North Carolina. The unique visual display may also be helpful in inferring another relational pattern of the others of the states to North Carolina, or to otherwise suggest another, deeper level of inquiry. For example, the user may quickly note that the unemployment patterns of neighboring states South Carolina, Virginia, and the near-by mid-Atlantic region states Delaware and Maryland, are strongly correlated (through the second level relationship information conveyed through the shadings. Considered in combination with their (first level) geographic proximity, the displayed information may indicate that a next, third level of relational data comparisons seeking states with similar data attributes should prioritize attention on (or bias toward) these four states relative to the remaining other states.

Although the examples discussed above use different, distinct grey-scale shadings, this is only for illustration purposes and other embodiments may use continuum scales or color keys. For example, an alternative to the correlation legend key 320 may be a color continuum that progresses leftward from a brightest green at the far right end signifying a highest positive correlation, through a continually darkening green as the positive correlation progressively weakens into black shade at the center, zero correlation, the color shading then becoming darkest red at the lowest, initial negative correlation values and gradually lightening to the left until reaching a brightest red color at the other, far left end signifying a highest negative correlation.

Thus an original simplicity or clarity of the initial presentation may be maintained, while adding new relational information to the presentation solely through altering icon appearances. In some embodiments the legend keys may be omitted to improve continuity to the first display, wherein the shadings, color changes or other appearance differences may be readily understood (for example, using "plus" or "minus" icons in place of the original rectangles), or when text explanation labels may be added directly to the icons. Still other embodiments may change the size or shape of the icons, or use different icons, to convey the second level, specific node comparison or correlation relational data. However, in each of said embodiments the additional second-level information is conveyed through changing visual appearance values of the icons without a need to change or otherwise disturb the attributes of the original two-dimensional display that convey the first, global level structural, relational information.

Figure 7:
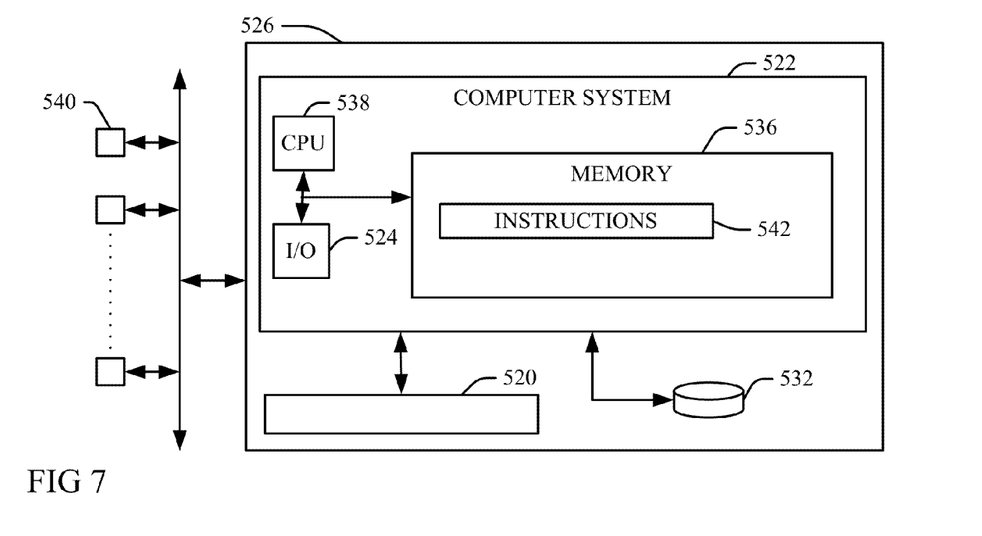
FIG. 7 is a block diagram illustration of a computerized implementation of an embodiment of the present invention.

Referring now to FIG. 7, an exemplary computerized implementation of an embodiment of the present invention includes a computer or other programmable device 522 in communication with network data sources 540 for providing the data object data 101. Instructions 542 reside within computer readable code in a computer readable memory 536, or in a computer readable storage system 532, or other tangible computer readable storage medium that is accessed through a computer network infrastructure 526 by a processing unit (CPU) 538. Thus, the instructions, when implemented by the processing unit (CPU) 538, cause the processing unit (CPU) 538 to perform interactive analysis of data objects within a display as described above with respect to FIG. 1, and in some embodiments of the present invention also with respect to one or more of FIGS. 2-6.

Figure 8:
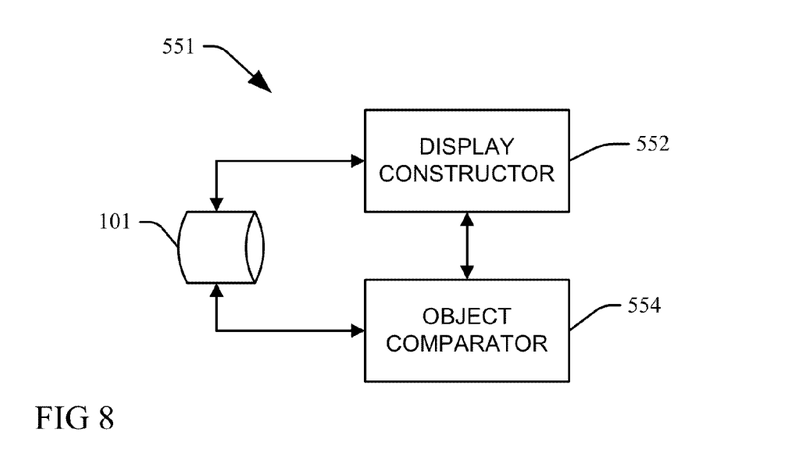
FIG. 8 is a block diagram illustration of an article according to the present invention.

FIG. 8 illustrates an embodiment of an article 551 (for example, a programmable device, system, etc.) according to the present invention that performs interactive analysis of data objects within a display as described above with respect to FIG. 1, and in some embodiments of the present invention also with respect to one or more of FIGS. 2-7. One or more of the components of the article 551 are tangible devices that perform specific functions, for example comprising the processing unit 538, computer readable memory 516 and tangible computer readable storage medium 532 of FIG. 7. More particularly, a Display Constructor 552 displays a plurality of icons representing different data objects with initial respective two-dimensional graphic display appearances at unique locations within a two-dimensional relational structure, the unique locations conveying relational information of respective values of display data variables of the objects. An Object Comparator 554 generates an appearances of the icons within the display at their unique locations in response to a specified comparison basis relative to a comparison data variable common to the data objects, the new appearances visually indicating relationships of respective values of the selected common comparison data variable of their represented data objects to a value of the selected common comparison data variable of the data object represented by a selected icon.

Embodiments of the present invention may also perform process steps of the invention on a subscription, advertising, and/or fee basis. That is, a service provider could offer to perform interactive analysis of data objects within a display as described above with respect to FIGS. 1-8. Thus, the service provider can create, maintain, and support, etc., a computer infrastructure such as the computer system 522, network environment 526, or parts thereof, or the article 551, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/551, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for interactive analysis of data objects within a display, the method comprising:

displaying a plurality of icons on a graphic display device representing each of a plurality of different data objects at each of a plurality of unique locations within a multi-dimensional relational structure as a function of unique respective values of dimensions of a display data variable that is relevant to the multi-dimensional relational structure and common to each of the data objects represented by the icons, and wherein the icons each have initial respective graphic display appearances comprising initial color channel shadings; and in response to a user selecting one of the icons, wherein the selecting specifies a comparison data variable common to each of the data objects represented by the icons, a processing unit generating an updated display of all of the icons at their unique locations within the multi-dimensional relational structure on the graphical display device, wherein:

the unique locations of the icons relative to the displayed multi-dimensional relational structure, are unchanged in the updated display; and the graphic display appearances of each of the icons are updated to revised dimensional graphic display appearances that each visually indicate relationships of respective values of the selected common comparison data variable of their represented data objects to a value of the selected common comparison data variable of the data object represented by the selected icon, wherein the revised dimensional graphic display appearances of the icons comprise a plurality of different color channel shadings visually distinct one from another and comprising:

a first color shading indicating that an attribute of the selected common comparison data variable of an associated data object is similar to an attribute of the selected common comparison data variable of the data object associated with the selected icon; and at least one second color shading visually different from the first color shading and indicating that an attribute of the selected common comparison data variable of an associated data object is dissimilar to the attribute of the selected common comparison data variable of the data object associated with the selected icon.

2. The method of claim 1, wherein the step of selecting the icon comprises selecting the icon through a cursor routine; and wherein the selecting the icon specifies the comparison data variable common to each of the data objects represented by the icons by:

evoking a pop-up dialog window comprising at least one of a radio button and a text entry box; and specifying the comparison data variable common to each of the data objects represented by the icons in response to a user input selection via the at least one radio button and text entry box.

3. The method of claim 1, wherein the at least one second color shading visually different from the first color shading is a plurality of different color shadings arrayed on a color shading spectrum, and wherein a position of each of the color shadings on the color shading spectrum indicate an amount of dissimilarity of the attribute of the selected common comparison data variable of an associated data object to the attribute of the selected common comparison data variable of the data object associated with the selected icon.

4. The method of claim 3, wherein the attributes of the specified comparison data variables common to the data objects are data values;

wherein the first color shading indicates that the value of the selected common comparison data variable of the associated data object is equivalent to the value of the selected common comparison data variable of the data object associated with the selected icon; and wherein the at least one second color shading visually different from the first color shading indicates that the value of the selected common comparison data variable of the associated data object is different from the value of the selected common comparison data variable of the data object associated with the selected icon.

5. The method of claim 3, wherein the attributes of the specified comparison data variables common to the data objects are data patterns;

wherein the first color shading indicates that the pattern of the selected common comparison data variable of the associated data object is correlated to the pattern of the selected common comparison data variable of the data object associated with the selected icon; and wherein the at least one second color shading visually different from the first color shading indicates that the pattern of the selected common comparison data variable of the associated data object is not correlated to the pattern of the selected common comparison data variable of the data object associated with the selected icon.

6. A method for deploying an application for interactive analysis of data objects within a display, the method comprising:

providing a computer infrastructure that:

causes a graphical display device to display a plurality of icons representing each of a plurality of different data objects at each of a plurality of unique locations within a multi-dimensional relational structure as a function of unique respective values of dimensions of a display data variable that is relevant to the multi-dimensional relational structure and common to each of the data objects represented by the icons, and wherein the icons each have initial respective graphic display appearances comprising initial color channel shadings; and in response to a user selecting one of the icons, wherein the selecting specifies a comparison data variable common to each of the data objects represented by the icons, causes the graphical display device to generate an updated display of all of the icons at their unique locations within the multi-dimensional relational structure, wherein:

the unique locations of the icons relative to the displayed multi-dimensional relational structure, are unchanged in the updated display; and the graphic display appearances of each of the icons are updated to revised dimensional graphic display appearances that each visually indicate relationships of respective values of the selected common comparison data variable of their represented data objects to a value of the selected common comparison data variable of the data object represented by the selected icon, wherein the revised dimensional graphic display appearances of the icons comprise a plurality of different color channel shadings visually distinct one from another and comprising:

a first color shading indicating that an attribute of the selected common comparison data variable of an associated data object is similar to an attribute of the selected common comparison data variable of the data object associated with the selected icon; and a plurality of different second color shadings arrayed on a color shading spectrum and each visually different from the first color shading, wherein positions of each of the second color shadings on the color shading spectrum indicate an amount of dissimilarity of an attribute of the selected common comparison data variable of an associated data object to the attribute of the selected common comparison data variable of the data object associated with the selected icon.

7. The method of claim 6, wherein the computer infrastructure further selects the icon in response to a user input through a graphical user interface cursor routine; and wherein the selecting the icon specifies the comparison data variable common to each of the data objects represented by the icons by:

evoking a pop-up dialog window comprising at least one of a radio button and a text entry box; and specifying the comparison data variable common to each of the data objects represented by the icons in response to a user input selection via the at least one radio button and text entry box.

8. The method of claim 6, wherein the attributes of the specified comparison data variables common to the data objects are data values;

wherein the first color shading indicates that the value of the selected common comparison data variable of the associated data object is equivalent to the value of the selected common comparison data variable of the data object associated with the selected icon; and wherein the at least one second color shading visually different from the first color shading indicates that the value of the selected common comparison data variable of the associated data object is different from the value of the selected common comparison data variable of the data object associated with the selected icon.

9. The method of claim 6, wherein the attributes of the specified comparison data variables common to the data objects are data patterns;
   wherein the first color shading indicates that the pattern of the selected common comparison data variable of the associated data object is correlated to the pattern of the selected common comparison data variable of the data object associated with the selected icon; and
   wherein the at least one second color shading visually different from the first color shading indicates that the pattern of the selected common comparison data variable of the associated data object is not correlated to the pattern of the selected common comparison data variable of the data object associated with the selected icon.

10. A system, comprising:
    a processing unit, a computer readable memory and a computer-readable storage medium;
    wherein the processing unit, when executing program instructions stored on the computer-readable storage medium via the computer readable memory:
    causes a graphic display device to display a plurality of icons representing each of a plurality of different data objects at each of a plurality of unique locations within a multi-dimensional relational structure as a function of unique respective values of dimensions of a display data variable that is relevant to the multi-dimensional relational structure and common to each of the data objects represented by the icons, and wherein the icons each have initial respective graphic display appearances comprising initial color channel shadings; and
    in response to a user selecting one of the icons, wherein the selecting specifies a comparison data variable common to each of the data objects represented by the icons, cause the graphic display device to generate an updated display of all of the icons at their unique locations within the multi-dimensional relational structure on the graphical display device, wherein:
    the unique locations of the icons relative to the displayed multi-dimensional relational structure, are unchanged in the updated display; and
    the graphic display appearances of each of the icons are updated to revised dimensional graphic display appearances that each visually indicate relationships of respective values of the selected common comparison data variable of their represented data objects to a value of the selected common comparison data variable of the data object represented by the selected icon, wherein the revised dimensional graphic display appearances of the icons comprise a plurality of different color channel shadings visually distinct one from another and comprising:
    a first color shading indicating that an attribute of the selected common comparison data variable of an associated data object is similar to an attribute of the selected common comparison data variable of the data object associated with the selected icon; and
    a plurality of different second color shadings arrayed on a color shading spectrum and each visually different from the first color shading, wherein positions of each of the second color shadings on the color shading spectrum indicate an amount of dissimilarity of an attribute of the selected common comparison data variable of an associated data object to the attribute of the selected common comparison data variable of the data object associated with the selected icon.

11. The system of claim 10, wherein the attributes of the specified comparison data variables common to the data objects are data values;
    wherein the first color shading indicates that the value of the selected common comparison data variable of the associated data object is equivalent to the value of the selected common comparison data variable of the data object associated with the selected icon; and
    wherein the at least one second color shading visually different from the first color shading indicates that the value of the selected common comparison data variable of the associated data object is different from the value of the selected common comparison data variable of the data object associated with the selected icon.

12. The system of claim 10, wherein the attributes of the specified comparison data variables common to the data objects are data patterns;
    wherein the first color shading indicates that the pattern of the selected common comparison data variable of the associated data object is correlated to the pattern of the selected common comparison data variable of the data object associated with the selected icon; and
    wherein the at least one second color shading visually different from the first color shading indicates that the pattern of the selected common comparison data variable of the associated data object is not correlated to the pattern of the selected common comparison data variable of the data object associated with the selected icon.

13. An article of manufacture, comprising:
    a computer readable tangible storage medium having computer readable program code embodied therewith, the computer readable program code comprising instructions that, when executed by a computer processor, cause the computer processor to:
    cause a graphic display device to display a plurality of icons representing each of a plurality of different data objects at each of a plurality of unique locations within a multi-dimensional relational structure as a function of unique respective values of dimensions of a display data variable that is relevant to the multi-dimensional relational structure and common to each of the data objects represented by the icons, and wherein the icons each have initial respective graphic display appearances comprising initial color channel shadings; and
    in response to a user selecting one of the icons, wherein the selecting specifies a comparison data variable common to each of the data objects represented by the icons, cause the graphic display device to generate an updated display of all of the icons at their unique locations within the multi-dimensional relational structure on the graphical display device, wherein:
    the unique locations of the icons relative to the displayed multi-dimensional relational structure, are unchanged in the updated display; and
    the graphic display appearances of each of the icons are updated to revised dimensional graphic display appearances that each visually indicate relationships of respective values of the selected common comparison data variable of their represented data objects to a value of the selected common comparison data variable of the data object represented by the selected icon, and wherein the revised dimensional graphic display appearances of the icons comprise a plurality of different color channel shadings visually distinct one from another and comprising:

a first color shading indicating that an attribute of the selected common comparison data variable of an associated data object is similar to an attribute of the selected common comparison data variable of the data object associated with the selected icon; and at least one second color shading visually different from the first color shading and indicating that an attribute of the selected common comparison data variable of an associated data object is dissimilar to the attribute of the selected common comparison data variable of the data object associated with the selected icon.

14. The article of manufacture of claim 13, wherein the at least one second color shading visually different from the first color shading is a plurality of different color shadings arrayed on a color shading spectrum, and wherein a position of each of the color shadings on the color shading spectrum indicate an amount of dissimilarity of the attribute of the selected common comparison data variable of an associated data object to the attribute of the selected common comparison data variable of the data object associated with the selected icon.

15. The article of manufacture of claim 14, wherein the attributes of the specified comparison data variables common to the data objects are data values;

wherein the first color shading indicates that the value of the selected common comparison data variable of the associated data object is equivalent to the value of the selected common comparison data variable of the data object associated with the selected icon; and wherein the at least one second color shading visually different from the first color shading indicates that the value of the selected common comparison data variable of the associated data object is different from the value of the selected common comparison data variable of the data object associated with the selected icon.

16. The article of manufacture of claim 14, wherein the attributes of the specified comparison data variables common to the data objects are data patterns;

wherein the first color shading indicates that the pattern of the selected common comparison data variable of the associated data object is correlated to the pattern of the selected common comparison data variable of the data object associated with the selected icon; and wherein the at least one second color shading visually different from the first color shading indicates that the pattern of the selected common comparison data variable of the associated data object is not correlated to the pattern of the selected common comparison data variable of the data object associated with the selected icon.

* * * * *